(12) United States Patent
Tashiro et al.

(10) Patent No.: US 10,913,326 B2
(45) Date of Patent: Feb. 9, 2021

(54) VEHICLE AIR-CONDITIONING APPARATUS AND ABNORMALITY DETECTION SYSTEM FOR VEHICLE AIR-CONDITIONING APPARATUS

(71) Applicant: Mitsubishi Electric Corporation, Tokyo (JP)

(72) Inventors: Yusuke Tashiro, Tokyo (JP); Yasutaka Ochiai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 16/306,416

(22) PCT Filed: Jun. 10, 2016

(86) PCT No.: PCT/JP2016/067342
§ 371 (c)(1),
(2) Date: Nov. 30, 2018

(87) PCT Pub. No.: WO2017/212631
PCT Pub. Date: Dec. 14, 2017

(65) Prior Publication Data
US 2020/0189358 A1 Jun. 18, 2020

(51) Int. Cl.
*B60H 1/00* (2006.01)
*B60H 1/32* (2006.01)
*B61D 27/00* (2006.01)

(52) U.S. Cl.
CPC ..... *B60H 1/00978* (2013.01); *B60H 1/00371* (2013.01); *B60H 1/00778* (2013.01); *B60H 1/3225* (2013.01); *B61D 27/00* (2013.01)

(58) Field of Classification Search
CPC ............ B60H 1/00978; B60H 1/00371; B60H 1/00778; B60H 1/3225; B60H 1/00; B61D 27/00; F25B 49/02
See application file for complete search history.

(56) References Cited

U.S. PATENT DOCUMENTS 5,623,426 A * 4/1997 Ozawa .................. F25B 49/043
62/101
6,101,820 A 8/2000 Cheballah
(Continued)

FOREIGN PATENT DOCUMENTS

DE 102008037485 A1 5/2010
FR 2772310 A1 6/1999
(Continued)

OTHER PUBLICATIONS

International Search Report (PCT/ISA/210) dated Aug. 16, 2016, by the Japan Patent Office as the International Searching Authority for International Application No. PCT/JP2016/067342.
(Continued)

*Primary Examiner* — Emmanuel E Duke
(74) *Attorney, Agent, or Firm* — Buchanan Ingersoll & Rooney PC

(57) ABSTRACT

A vehicle air-conditioning apparatus includes a refrigerant circuit and a control unit which controls the refrigerant circuit, and is mounted on a vehicle. The control unit determines whether or not the vehicle is stationary based on position information or speed information on the vehicle, causes the refrigerant circuit to operate when the vehicle is stationary, acquires state data on the refrigerant circuit at the time when the vehicle is stationary, and detects whether abnormality occurs in the refrigerant circuit based on the state data.

5 Claims, 5 Drawing Sheets

(56) References Cited

U.S. PATENT DOCUMENTS

| | | | |
|---|---|---|---|
| 6,318,097 B1 | 11/2001 | Wieszt | |
| 9,829,230 B2* | 11/2017 | Tamaki | F25B 49/00 |
| 2004/0083744 A1 | 5/2004 | Harte | |
| 2010/0174412 A1* | 7/2010 | Kwon | F24F 11/30 |
| | | | 700/275 |
| 2011/0071722 A1* | 3/2011 | Uto | B61D 27/0018 |
| | | | 701/29.5 |
| 2012/0109429 A1* | 5/2012 | Shiota | B61D 27/0072 |
| | | | 701/19 |
| 2014/0150482 A1* | 6/2014 | Ueno | H02H 7/0852 |
| | | | 62/126 |
| 2015/0184880 A1* | 7/2015 | Kawamura | F24F 11/30 |
| | | | 700/276 |
| 2015/0298525 A1* | 10/2015 | Miyakoshi | F25B 40/00 |
| | | | 62/160 |
| 2015/0352926 A1* | 12/2015 | Johnston | B60K 11/02 |
| | | | 180/271 |
| 2016/0159198 A1* | 6/2016 | Tang | B60H 1/00885 |
| | | | 700/300 |
| 2016/0200176 A1* | 7/2016 | Stanke | B60H 1/00978 |
| | | | 62/115 |

FOREIGN PATENT DOCUMENTS

| | | | |
|---|---|---|---|
| JP | 4975052 B2 | | 4/2012 |
| JP | 2014230353 A | * | 12/2014 |
| JP | 2014230353 A | | 12/2014 |
| KR | 101497048 B1 | * | 2/2015 |
| KR | 101497048 B1 | | 2/2015 |

OTHER PUBLICATIONS

Written Opinion (PCT/ISA/237) dated Aug. 16, 2016, by the Japan Patent Office as the International Searching Authority for International Application No. PCT/JP2016/067342.

Office Action dated Mar. 3, 2020, issued in corresponding Chinese Patent Application No. 201680086423.7, 8 pages including 3 pages of English translation.

Office Action dated Jan. 24, 2020, issued in corresponding European Patent Application No. 16904665.3, 5 pages.

Extended European Search Report dated May 17, 2019, issued by the European Patent Office in corresponding European Application No. 16904665.3. (7 pages).

Office Action dated Oct. 9, 2019, by the Chinese Patent Office in corresponding Chinese Patent Application No. 2016800864231 and English translation of the Office Action. (10 pages).

Office Action dated Aug. 20, 2020, issued in corresponding European Patent Application No. 16904665.3, 5 pages.

Office Action dated Sep. 1, 2020, issued in corresponding Chinese Patent Application No. 201680086423.7, 8 pages including 3 pages of English translation.

* cited by examiner

VEHICLE AIR-CONDITIONING APPARATUS AND ABNORMALITY DETECTION SYSTEM FOR VEHICLE AIR-CONDITIONING APPARATUS

TECHNICAL FIELD

The present invention relates to a vehicle air-conditioning apparatus to be mounted on a vehicle, and an abnormality detection system for the vehicle air-conditioning apparatus.

BACKGROUND ART

Patent Literature 1 discloses a refrigeration cycle apparatus. In this refrigeration cycle apparatus, a calculation refrigerant amount is calculated based on an operation-state amount of a refrigerant circuit, a value obtained by correcting the calculation refrigerant amount is compared with an appropriate refrigerant amount, and it is determined whether a refrigerant amount is excess or deficient based on the result of the comparison. This determination is made at regular intervals.

CITATION LIST

Patent Literature

Patent Literature 1: Japanese Patent No. 4975052

SUMMARY OF INVENTION

Technical Problem

A refrigeration cycle apparatus includes a stationary air-conditioning apparatus and a non-stationary air-conditioning apparatus such as a vehicle air-conditioning apparatus. In the stationary type air-conditioning apparatus, it is determined at regular intervals whether abnormality such as excess or deficiency of the amount of refrigerant occurs or not, and the abnormality can thus be detected early if it occurs.

In contrast, in the vehicle air-conditioning apparatus, the operation conditions greatly vary in accordance with the traveling state of a vehicle. Thus, there is a case where it is hard to detect abnormality under a traveling state. Therefore, in the vehicle air-conditioning apparatus, even if it is determined at regular intervals whether abnormality occurs or not, there is a case where the abnormality cannot be detected early.

The present invention has been made to solve the above problem, and an object of the present invention is to provide a vehicle air-conditioning apparatus and an abnormality detection system for the vehicle air-conditioning apparatus, which can detect abnormality early if it occurs.

Solution to Problem

A vehicle air-conditioning apparatus according to an embodiment of the present invention includes a refrigerant circuit and a control unit which controls the refrigerant circuit, and is mounted on a vehicle. The control unit determines whether or not the vehicle is stationary based on position information or speed information on the vehicle, causes the refrigerant circuit to operate when the vehicle is stationary, acquires state data on the refrigerant circuit at the time when the vehicle is stationary, and detects whether abnormality occurs in the refrigerant circuit based on the state data.

An abnormality detection system for a vehicle air-conditioning apparatus mounted on a vehicle, according to the embodiment of the present invention, includes: the vehicle air-conditioning apparatus which includes a refrigerant circuit and a control unit which controls the refrigerant circuit; and a ground system connected to the control unit via a communication network. The control unit determines whether or not the vehicle is stationary based on position information or speed information on the vehicle, causes the refrigerant circuit to operate when the vehicle is stationary, acquires state data on the refrigerant circuit at the time when the vehicle is stationary, and transmits the state data to the ground system. The ground system detects whether abnormality occurs in the refrigerant circuit based on the state data.

Advantageous Effects of Invention

According to embodiments of the present invention, it is possible to detect abnormality in a refrigerant circuit when a vehicle is stopped, even if the abnormality occurs in the refrigerant circuit while the vehicle is traveling. It is therefore possible to detect the abnormality of the refrigerant circuit at an early stage.

DESCRIPTION OF EMBODIMENTS

Embodiment 1

Figure 1:
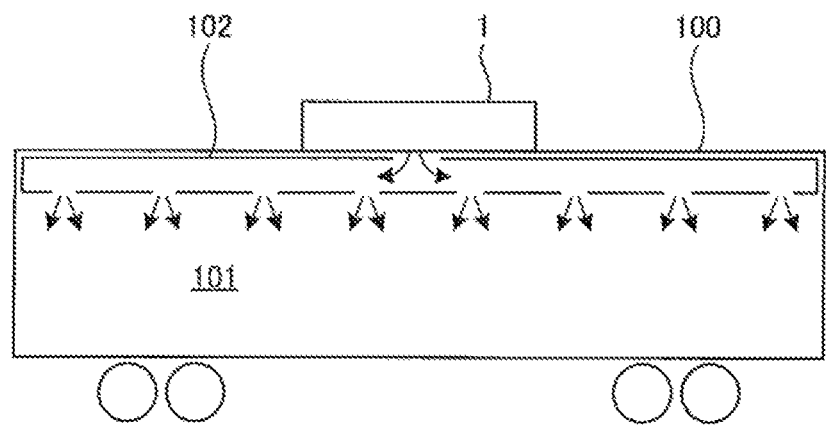
FIG. 1 is a schematic side view illustrating a configuration of a railway vehicle 100 on which a vehicle air-conditioning apparatus 1 according to embodiment 1 of the present invention is mounted.

A vehicle air-conditioning apparatus and an abnormality detection system for the vehicle air-conditioning apparatus, according to embodiment 1 of the present invention, will be described. FIG. 1 is a schematic side view illustrating a configuration of a railway vehicle 100 on which a vehicle air-conditioning apparatus 1 according to embodiment 1 is mounted. It should be noted that in the following figures including FIG. 1, the relationship in dimension between components and the shapes thereof may be different from those of actual components.

As illustrated in FIG. 1, the vehicle air-conditioning apparatus 1 is mounted on a roof of the railway vehicle 100. An air duct 102 is provided in a ceiling of a compartment 101 in the railway vehicle 100. From the vehicle air-conditioning apparatus 1, air for air-conditioning is made to blow into the compartment 101 through the air duct 102. Then, air in the compartment 101 is sucked into the vehicle air-conditioning apparatus 1 through a return air duct (not illustrated). It should be noted that the vehicle air-conditioning apparatus 1 of the present embodiment is mounted on the roof of the railway vehicle 100, but it may be mounted under a floor of the railway vehicle 100.

The railway vehicle 100 forms part or the whole of a single train. In other words, a single train is made up of at least one railway vehicle 100. In a single railway vehicle 100, one or more vehicle air-conditioning apparatuses 1 are mounted.

Figure 2:
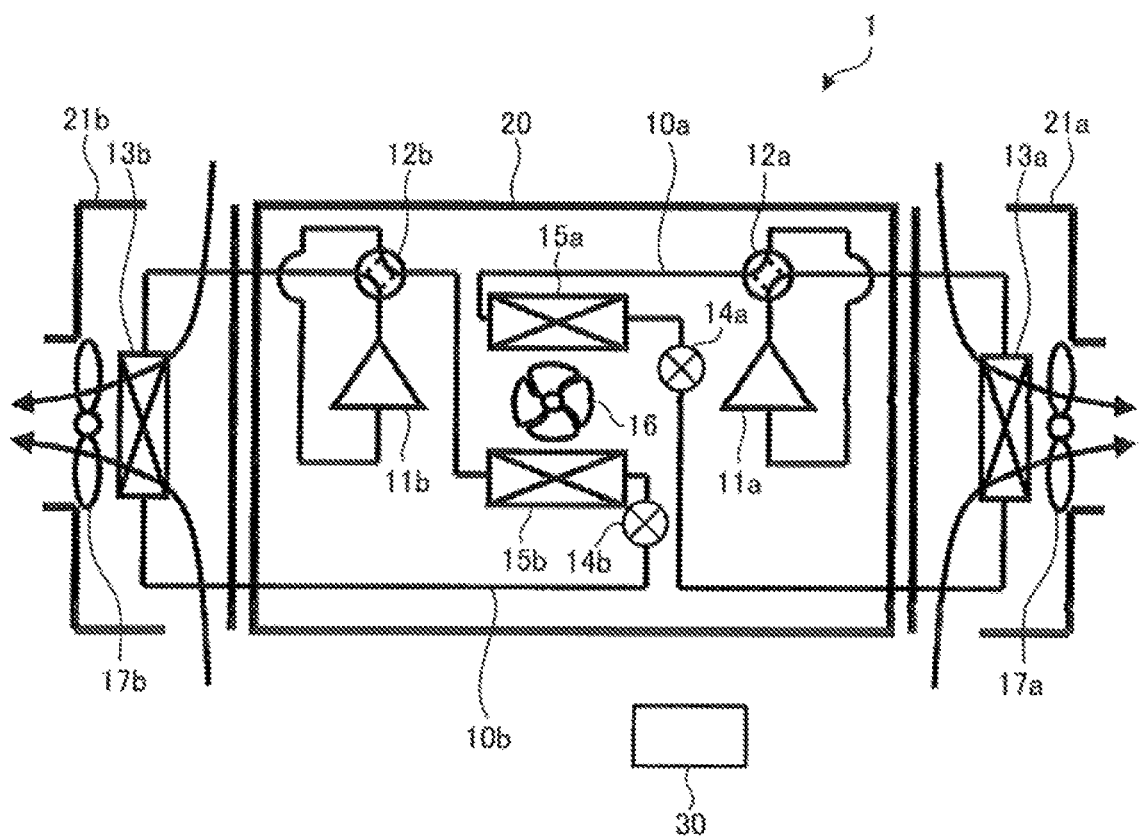
FIG. 2 is a schematic refrigerant circuit diagram illustrating a configuration of the vehicle air-conditioning apparatus 1 according to embodiment 1 of the present invention.

FIG. 2 is a schematic refrigerant circuit diagram illustrating a configuration of the vehicle air-conditioning apparatus 1. As illustrated in FIG. 2, the vehicle air-conditioning apparatus 1 includes, for example, two refrigerant circuits 10a and 10b. The vehicle air-conditioning apparatus 1 includes an outdoor chamber 20, and indoor chambers 21a and 21b which are respectively provided on right and left sides of the outdoor chamber 20 in the longitudinal direction of the railway vehicle 100, with the outdoor chamber 20 interposed between the indoor chambers 21a and 21b.

In a configuration of the refrigerant circuit 10a, a compressor 11a, a four-way valve 12a, an indoor heat exchanger 13a, a pressure-reducing device 14a (for example, a linear electronic expansion valve) and an outdoor heat exchanger 15a are connected by refrigerant pipes. During a heating operation, the compressor 11a, the indoor heat exchanger 13a, the pressure-reducing device 14a and the outdoor heat exchanger 15a are connected in this order. Thereby, the indoor heat exchanger 13a functions as a condenser, and the outdoor heat exchanger 15a functions as an evaporator. During a cooling operation, a refrigerant flow path is switched by the four-way valve 12a, and the compressor 11a, the outdoor heat exchanger 15a, the pressure-reducing device 14a and the indoor heat exchanger 13a are connected in this order. Thereby, the indoor heat exchanger 13a functions as an evaporator, and the outdoor heat exchanger 15a functions as a condenser. The compressor 11a, the four-way valve 12a, the pressure-reducing device 14a and the outdoor heat exchanger 15a are provided in the outdoor chamber 20. The indoor heat exchanger 13a is provided in the indoor chamber 21a.

Similarly, in a configuration of the refrigerant circuit 10b, a compressor 11b, a four-way valve 12b, an indoor heat exchanger 13b, a pressure-reducing device 14b (for example, a linear electronic expansion valve) and an outdoor heat exchanger 15b are connected by refrigerant pipes. The compressor 11b, the four-way valve 12b, the pressure-reducing device 14b and the outdoor heat exchanger 15b are provided in the outdoor chamber 20. The indoor heat exchanger 13b is provided in the indoor chamber 21b.

In the outdoor chamber 20, an outdoor fan 16 which sends outdoor air to the outdoor heat exchangers 15a and 15b is provided. In the indoor chamber 21a, an indoor fan 17a which sends indoor air to the indoor heat exchanger 13a is provided. Indoor air which has passed through the indoor heat exchanger 13a and exchanged heat with the refrigerant is supplied to, for example, a front portion of the vehicle which is located in the compartment 101. In the indoor chamber 21b, an indoor fan 17b which sends indoor air to the indoor heat exchanger 13b is provided. Indoor air which has passed through the indoor heat exchanger 13b and exchanged heat with refrigerant is supplied to, for example, a rear portion of the vehicle which is located in the compartment 101.

The vehicle air-conditioning apparatus 1 includes a terminal 30 as a controller. The terminal 30 includes a microcomputer provided with a CPU, a ROM, a RAM, an I/O port, etc. The terminal 30 controls the operations of the entire refrigerant circuits 10a and 10b which include the compressors 11a and 11b, the outdoor fan 16, and the indoor fans 17a and 17b based on, for example, detection signals output from various sensors. The terminal 30 functions as a controller of the vehicle air-conditioning apparatus 1, and forms part of an abnormality detection system 2, which will be described later. In the present embodiment, air-conditioning apparatuses 1 include respective terminals 30, but the refrigerant circuits 10a and 10b may include respective terminals 30.

Figure 3:
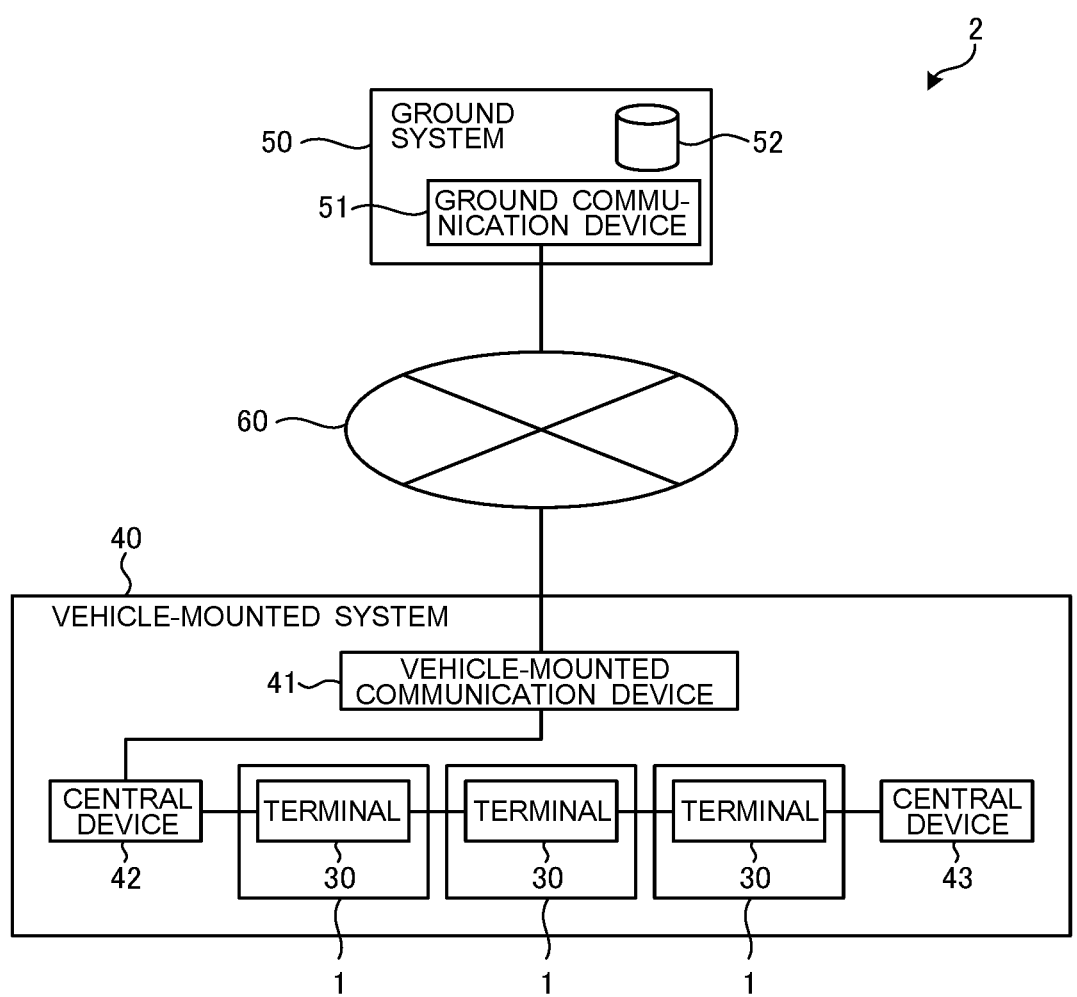
FIG. 3 is a schematic block diagram illustrating a configuration of an abnormality detection system 2 for the vehicle air-conditioning apparatus 1 according to embodiment 1 of the present invention.

FIG. 3 is a schematic block diagram illustrating a configuration of the clogging detection system 2 for the vehicle air-conditioning apparatus 1, according to the present embodiment. As illustrated in FIG. 3, the abnormality detection system 2 includes at least one vehicle-mounted system 40, and a ground system 50 which is connected to the vehicle-mounted system 40 via a communication network 60. The communication network 60 is a communication network using a wireless communication such as a mobile phone, a wireless LAN, WiMAX (registered trademark) or a millimeter wave.

The vehicle-mounted system 40 is mounted on a train of railway vehicles 100. One vehicle-mounted system 40 is typically mounted on one train. The vehicle-mounted system 40 includes a vehicle-mounted communication device 41 which communicates with the ground system 50 via the communication network 60, central devices 42 and 43 which are provided at respective ones of the railway vehicles 100, which are located at front and rear ends of the train, and a plurality of terminals 30 provided, for example, in respective vehicle air-conditioning apparatuses 1. The vehicle-mounted communication device 41, the central devices 42 and 43 and the terminals 30 function as controllers which control the vehicle air-conditioning apparatuses 1 mounted on the train.

The ground system 50 includes a ground communication device 51 which communicates with the vehicle-mounted system 40 via the communication network 60, a database 52 which stores data received from the vehicle-mounted system 40, and a controller (not illustrated) which controls the ground communication device 51 and the database 52. The ground system 50 transmits and receives data to and from at least one vehicle-mounted system 40 via the communication network 60 to remotely monitor each of the vehicle air-conditioning apparatuses 1.

Figure 4:
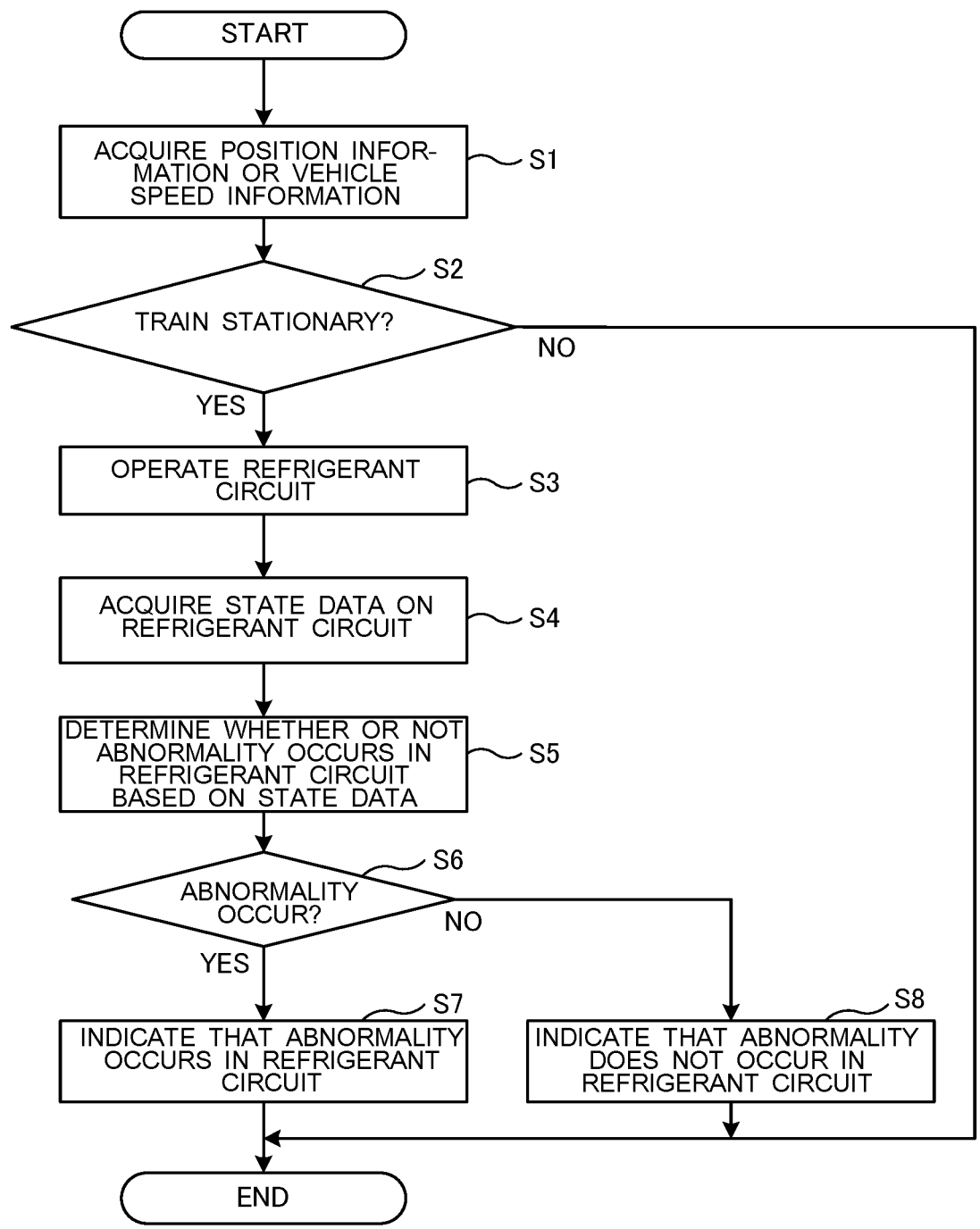
FIG. 4 is a flowchart illustrating an example of the flow of abnormality detection processing to be executed by a terminal 30 in the vehicle air-conditioning apparatus 1 according to embodiment 1 of the present invention.

FIG. 4 is a flowchart illustrating an example of the flow of abnormality detection processing to be executed by the terminal 30 in the vehicle air-conditioning apparatus 1 according to the present embodiment. The abnormality detection processing as indicated in FIG. 4 is repeatedly executed at regular intervals.

In step S1 as indicated in FIG. 4, the terminal 30 acquires position information or vehicle speed information on the train including the railway vehicle 100, from any of the vehicle-mounted communication device 41 and the central devices 42 and 43. In the following, the vehicle speed information is also referred to as speed information. The position information on the train may be two-dimensional or three-dimensional position information received from a GPS, or kilometrage information on the distance from a station to the train.

In step S2, the terminal 30 determines whether or not the train is stationary based on the acquired position information or vehicle speed information. The "stationary" in this case means that the train is temporarily stopped during train service. In the case where the terminal 30 acquires position information on the train, if this acquired position information coincides with previously acquired position information, the terminal 30 can determine that the train is stationary. In the case where the terminal 30 acquires vehicle speed information of the train, if the vehicle speed is zero, the terminal 30 can determine that the train is stationary. In the case where the terminal 30 stores position information on stations at which the train will be stopped, the terminal 30 may be configured to determine that the train is stationary only when the train is stationary at any of the stations, and determine that the train is not stationary when the train is stationary at a location other than the stations. Alternatively, the terminal 30 may be configured to determine that the train is stationary whenever the train is stationary, regardless of where the train is stationary. In step S2, when the terminal 30 determines that the train is stationary, the process to be performed proceeds to step S3, and when the terminal 30 determines that the train is not stationary, the process ends.

In step S3, the terminal 30 forcibly causes the refrigerant circuits 10a and 10b to operate. To be more specific, when the refrigerant circuits 10a and 10b are in stopped state, the terminal 30 causes the refrigerant circuits 10a and 10b to start to operate, and when the refrigerant circuits 10a and 10b have already operated, the terminal 30 causes the refrigerant circuits 10a and 10b to continue to operate.

In step S4, the terminal 30 acquires state data on the refrigerant circuits 10a and 10b at the time when the train is stationary. The following are examples of the state data of the refrigerant circuits 10a and 10b: the degree of superheat at an outlet of the evaporator (for example, the indoor heat exchangers 13a and 13b during the cooling operation); the pressures of low-pressure sides of the refrigerant circuits 10a and 10b; input to the outdoor fan 16 and the indoor fans 17a and 17b; the discharge temperature at each of the compressors 11a and 11b; and the input to the compressors 11a and 11b. That is, the state data of the refrigerant circuits 10a and 10b includes data related to, for example, temperature, pressure, current and electric power. Preferably, the state data on the refrigerant circuits 10a and 10b should be acquired under the same operation condition as state data on these circuits was previously acquired (for example, when the train was stationary at a previous station). Also, preferably, the state data on the refrigerant circuits 10a and 10b should be acquired, with a refrigeration cycle stabilized, after the elapse of predetermined time from the start of the operation of the refrigerant circuits 10a and 10b. The operation of the refrigerant circuits 10a and 10b may be stopped after acquiring the state data on the refrigerant circuits 10a and 10b. The terminal 30 may be configured not to acquire the state data when it is detected that the train which has been stationary is started before the state data on the refrigerant circuits 10a and 10b is acquired.

In step S5, the terminal 30 determines whether or not abnormality occurs in the refrigerant circuits 10a and 10b based on the acquired state data. For example, the terminal 30 compares currently acquired state data with previously acquired state data (for example, state data acquired when the train was stationary at a previous station) acquired state data, and determines whether or not abnormality occurs in the refrigerant circuits 10a and 10b based on the result of the comparison. For example, in the case where the degree of superheat at the outlet of the evaporator and the pressures of the low-pressure sides of the refrigerant circuits decrease, as compared with those indicated in the previously acquired state data, it can be determined that clogging occurs in an expansion valve. In the case where the input to the fan increases as compared with that indicated in the previously acquired state data, it can be determined that the performance of the heat exchanger deteriorates or a malfunction occurs in the fan. In the case where the discharge temperature at the compressor or the input to the compressor increases, as compared with that indicated in the previously acquired state data, it can be determined that abnormality occurs in the compressor.

The terminal 30 may be configured to compare the acquired state data with state data acquired from a vehicle air-conditioning apparatus mounted on another vehicle in the train including the railway vehicle 100, and determine whether or not abnormality occurs in the refrigerant circuits 10a and 10b based on the result of the comparison. The state data on the vehicle air-conditioning apparatus mounted on the other vehicle can be, for example, acquired from any of the terminal 30, the central devices 42 and 43 and the vehicle-mounted communication device 41 of the vehicle air-conditioning apparatus mounted on the other vehicle.

When the terminal 30 determines that abnormality occurs in the refrigerant circuits 10a and 10b (Yes in step S6), the process proceeds to step S7, and when the terminal 30 determines that abnormality does not occur (No in step S6), the process proceeds to step S8.

In step S7, the terminal 30 indicates that abnormality occurs in the refrigerant circuits 10a and 10b. For example, the terminal 30 transmits information indicating what abnormality occurs in the refrigerant circuits 10a and 10b to the central devices 42 and 43. The central devices 42 and 43 causes respective display units provided thereat to display information indicating what abnormality occurs and in which of the vehicle air-conditioning apparatuses 1 the abnormality occurs. The terminal 30 may transmit the information indicating what abnormality occurs in the refrigerant circuits 10a and 10b to the ground system 50 via the vehicle-mounted communication device 41. The ground system 50 may cause a display unit provided thereat to display information indicating which of the trains is a train including a vehicle air-conditioning apparatus 1 that the abnormality occurs, which of the vehicle air-conditioning apparatuses 1 is the vehicle air-conditioning apparatus 1 that the abnormality occurs, and what the abnormality is.

In step S8, the terminal 30 indicates that abnormality does not occur in the refrigerant circuit 10a or the refrigerant circuit 10b. For example, the terminal 30 transmits information indicating that abnormality does not occur in the refrigerant circuit 10a or the refrigerant circuit 10b to the central devices 42 and 43. The central devices 42 and 43 cause the display units provided thereat to display information indicating which of the vehicle air-conditioning apparatuses 1 has no abnormality. The terminal 30 may transmit the information indicating that abnormality does not occur in the refrigerant circuit 10a or the refrigerant circuit 10b to the ground system 50 via the vehicle-mounted communication device 41. The ground system 50 may be configured to cause the display unit provided thereat to display the information indicating which of the trains is a train including a vehicle air-conditioning apparatus 1 that abnormality does not occur, and which of the vehicle air-conditioning apparatuses 1 is the vehicle air-conditioning apparatus 1 that abnormality does not occur.

As described above, the vehicle air-conditioning apparatus 1 according to the present embodiment includes the refrigerant circuits 10a and 10b, and the control unit (the terminal 30 in the present embodiment) which controls the refrigerant circuits 10a and 10b. The vehicle air-conditioning apparatus 1 is also mounted on the railway vehicle 100. The control unit determines whether or not the railway vehicle 100 is stationary based on the position information or speed information on the railway vehicle 100, causes the refrigerant circuits 10a and 10b to operate when the railway vehicle 100 is stationary, acquires state data on the refrigerant circuits 10a and 10b at the time when the railway vehicle 100 is stationary, and detects whether abnormality occurs in the refrigerant circuits 10a and 10b based on the state data.

Vibration of the traveling railway vehicle 100 is transmitted to the vehicle air-conditioning apparatus 1. Therefore, there is a case where while the railway vehicle 100 is traveling, deterioration of each of components of the vehicle air-conditioning apparatus 1 is promoted or abnormality easily occurs in the vehicle air-conditioning apparatus 1, even when the vehicle air-conditioning apparatus 1 itself is not operated. For example, if the vibration is transmitted to the compressors 11a and 11b, there is a possibility that a rotor and a stator will collide with each other and be damaged. If the vibration is transmitted to the refrigerant pipe, there is a possibility that a joint of a refrigerant pipe will be damaged, and refrigerant will leak therefrom. Also, if the vibration is transmitted to the compressors 11a and 11b or the refrigerant pipe, there is a possibility that solids adhering to the inside of the compressor or that of the refrigerant pipe will come off, and as a result clocking will occur in the expansion valve. Furthermore, if the vibration is transmitted to the compressors 11a and 11b or the refrigerant pipe, there is a possibility that refrigerating machine oil in the refrigerant circuits 10a and 10b will be made nonuniform, and refrigerating machine oil in the compressors 11a and 11b will be depleted, thus damaging the compressors 11a and 11b.

In the present embodiment, even if abnormality occurs in the refrigerant circuits 10a and 10b while the railway vehicle 100 is traveling, it is possible to detect the abnormality in the refrigerant circuits 10a and 10b when the railway vehicle 100 is stopped at a station or the like. Therefore, according to the present embodiment, the control unit can detect the abnormality of the refrigerant circuits 10a and 10b at an early stage. Therefore, a defective condition of the vehicle air-conditioning apparatus 1 which results from the abnormality can be corrected at an early stage.

While the railway vehicle 100 is traveling, the operation conditions of the refrigerant circuits 10a and 10b easily vary since they are affected by wind and vibration made while the railway vehicle 100 is traveling. Thus, state data on the refrigerant circuits 10a and 10b which is acquired by the control unit while the railway vehicle 100 is traveling is not stable, and it is therefore hard to detect whether or not abnormality occur in the refrigerant circuits 10a and 10b. In contrast, while the railway vehicle 100 is stationary, the vehicle air-conditioning apparatus 1 is not affected by wind or vibration which would be made while the railway vehicle 100 is traveling, and the state of the vehicle air-conditioning apparatus 1 is thus close to that of a stationary air-conditioning apparatus. Therefore, by acquiring the state date on the refrigerant circuits 10a and 10b when the railway vehicle 100 is stationary, the operation conditions of the refrigerant circuits 10a and 10b at the timing when the state data is acquired can be easily made to be the same as each other. Therefore, it is possible to improve the accuracy of detection of whether or not abnormality occurs in the refrigerant circuits 10a and 10b at least to the same level as that of the stationary type of air-conditioning apparatus, thereby preventing erroneous detection.

In the vehicle air-conditioning apparatus 1 according to the present embodiment, the control unit may be configured to compare acquired state data with previously acquired state data, and detect whether or not abnormality occurs in the refrigerant circuits 10a and 10b based on the result of the comparison. Also, the control unit may be configured to compare the acquired state data with state data acquired from a vehicle air-conditioning apparatus mounted on a vehicle other than the railway vehicle 100 (for example, another vehicle which is included in the same train as the railway vehicle 100), and detect whether or not abnormality occurs in the refrigerant circuits 10a and 10b based on the result of the comparison.

Embodiment 2

An abnormality detection system for a vehicle air-conditioning apparatus according to embodiment 2 of the present invention will be described. In embodiment 1 described above, abnormality in the refrigerant circuits 10a and 10b is detected by the terminal 30 of each of the vehicle air-conditioning apparatuses 1. In contrast, in embodiment 2, abnormality in the refrigerant circuits 10a and 10b is detected by the ground system 50. A schematic configuration of an abnormality detection system 2 is the same as that as illustrated in FIG. 3.

Figure 5:
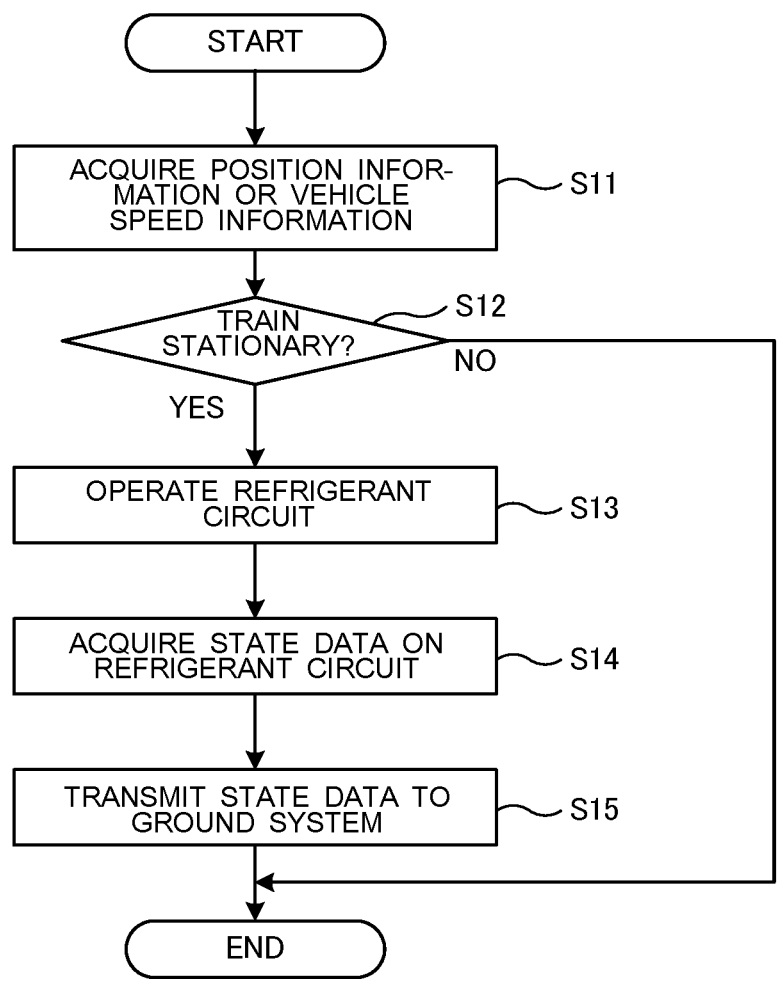
FIG. 5 is a flowchart illustrating an example of the flow of state data acquisition processing to be executed by a terminal 30 in an abnormality detection system 2 for a vehicle air-conditioning apparatus 1 according to embodiment 2 of the present invention.

FIG. 5 is a flowchart illustrating an example of the flow of state data acquisition processing to be executed by the terminal 30 in the abnormality detection system 2 for the vehicle air-conditioning apparatus 1 according to embodiment 2. Steps S11 to S14 as indicated in FIG. 5 are the same as steps S1 to S4 as indicated in FIG. 4, and their descriptions will thus be omitted.

In step S15, the terminal 30 transmits state data on the refrigerant circuits 10a and 10b to the ground system 50 via the vehicle-mounted communication device 41 and the communication network 60.

Figure 6:
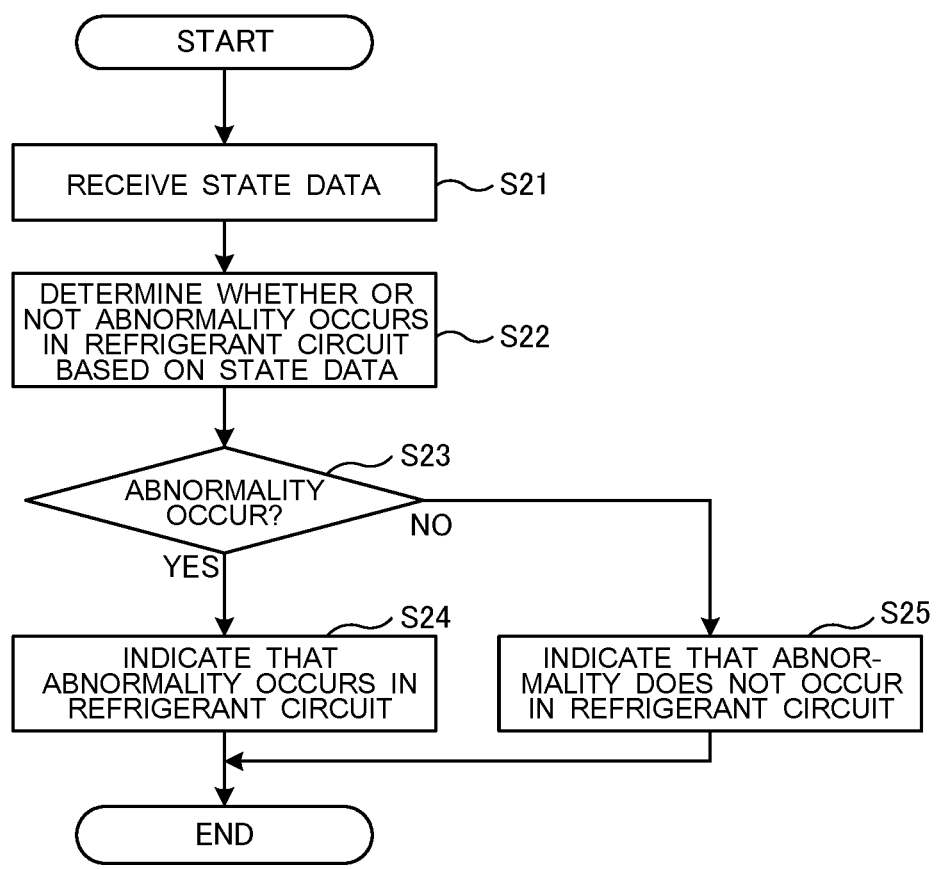
FIG. 6 is a flowchart illustrating an example of the flow of abnormality detection processing to be executed by a ground system 50 in the abnormality detection system 2 for the vehicle air-conditioning apparatus 1 according to embodiment 2 of the present invention.

FIG. 6 is a flowchart illustrating an example of the flow of abnormality detection processing to be executed by the ground system 50 in the abnormality detection system 2 for the vehicle air-conditioning apparatus 1 according to embodiment 2. In step S21 as indicated in FIG. 6, the ground system 50 receives state data on the refrigerant circuits 10a and 10b from a vehicle-mounted system 40 of a given train. The ground system 50 stores the received state data in a database 52. The database 52 stores state data items which are transmitted from respective vehicle-mounted systems 40a.

In step S22, the ground system 50 compares the state data received from the vehicle-mounted system 40 of the train with state data received from an vehicle-mounted system of another train (e.g., a train which travels ahead of or behind the above train), and determines whether or not abnormality occurs in the refrigerant circuits 10a and 10b based on the result of the comparison. For example, when the degree of superheat at the outlet of the evaporator and the pressures of the low-pressure sides of the refrigerant circuits lower as compared with those indicated in the state data received from the vehicle-mounted system of the other train, it can be determined that clogging occurs in in the expansion valve. When the input to the fan increases as compared with that indicated in the state data received from the vehicle-mounted system of the other train, it can be determined that the performance of the heat exchanger deteriorates or a malfunction occurs in the fan. When the discharge temperature at the compressor increases or the input to the compressor increases, as compared with that indicated in the state data received from the vehicle-mounted system of the other train, it can be determined that abnormality occurs in the compressor.

When it is determined that abnormality occurs in the refrigerant circuits 10a and 10b (Yes in step S23), the process proceeds to step S24, and when it is determined that abnormality does not occur in the refrigerant circuit 10a or the refrigerant circuit 10b (No in step S23), the process proceeds to step S25.

In step S24, the ground system 50 indicates that abnormality occurs in the refrigerant circuits 10a and 10b. For example, the ground system 50 causes the display unit provided thereat to display the information indicating which of the trains is a train including a vehicle air-conditioning apparatus 1 that abnormality occurs, which of the vehicle air-conditioning apparatuses 1 is the vehicle air-conditioning apparatus 1 that abnormality occurs, and what the abnormality is. The ground system 50 may transmit information indicating which of the vehicle air-conditioning apparatuses 1 is the vehicle air-conditioning apparatus 1 that abnormality occurs and what the abnormality is to the vehicle-mounted system 40 of the train on which the vehicle air-conditioning apparatus 1 that abnormality occurs is mounted. In this case, upon reception of the above information, the vehicle-mounted system 40 causes the display unit provided at each of the central devices 42 and 43 to display the information indicating which of the vehicle air-conditioning apparatuses 1 is the vehicle air-conditioning apparatus 1 that abnormality occurs, and what the abnormality is.

In step S25, the ground system 50 indicates that abnormality does not occur in the refrigerant circuit 10a or the refrigerant circuit 10b. For example, the ground system 50 causes the display unit provided thereat to display information indicating which of the trains is a train including a vehicle air-conditioning apparatus 1 that abnormality does not occur, and which of the vehicle air-conditioning apparatuses 1 is the vehicle air-conditioning apparatus 1 that abnormality does not occur. The ground system 50 may transmit information indicating which of the vehicle air-conditioning apparatuses 1 is the vehicle air-conditioning apparatus 1 that abnormality does not occur to the vehicle-mounted system 40 of the train on which the vehicle air-conditioning apparatus 1 that abnormality does not occur is mounted. In this case, upon reception of the above information, the vehicle-mounted system 40 causes, for example, the display unit provided at each of the central devices 42 and 43 to display the information indicating which of the vehicle air-conditioning apparatuses 1 is the vehicle air-conditioning apparatus 1 that abnormality does not occur.

As described above, the abnormality detection system 2 for the vehicle air-conditioning apparatus 1 according to embodiment 2 includes: the vehicle air-conditioning apparatus 1 which includes the refrigerant circuits 10a and 10b and the control units (for example, the vehicle-mounted communication device 41, the central devices 42 and 43, and the terminal 30) which controls the refrigerant circuits 10a and 10b; and the ground system 50 connected to the control unit via the communication network 60. The vehicle air-conditioning apparatus 1 is mounted on the railway vehicle 100. The control unit of the vehicle air-conditioning apparatus 1 determines whether or not the railway vehicle 100 is stationary based on the position information or speed information on the railway vehicle 100, causes the refrigerant circuits 10a and 10b to operate when the railway vehicle 100 is stationary, acquires the state data on the refrigerant circuits 10a and 10b at the time when the railway vehicle 100 is stationary, and transmits the state data to the ground system 50. The ground system 50 detects whether abnormality occurs in the refrigerant circuits 10a and 10b based on the state data.

According to embodiment 2, it is possible to detect abnormality in the refrigerant circuits 10a and 10b at an early stage if the abnormality occurs, as in embodiment 1.

In the abnormality detection system 2 for the vehicle air-conditioning apparatus 1 according to embodiment 2, the ground system 50 may be configured to compare the state data with state data acquired from a vehicle air-conditioning apparatus mounted on a vehicle included in a train other than the train including the railway vehicle 100, and detect whether abnormality occurs in the refrigerant circuits 10a and 10b based on the result of the comparison.

The above embodiments and modifications can be combined and put to practical use.

| Reference Signs List | |
|---|---|
| 1 | vehicle air-conditioning apparatus |
| 2 | abnormality detection system |
| 10a, 10b | refrigerant circuit |
| 11a, 11b | compressor |
| 12a, 12b | four-way valve |
| 13a, 13b | indoor heat exchanger |
| 14a, 14b | pressure-reducing device |
| 15a, 15b | outdoor heat exchanger |
| 16 | outdoor fan |
| 17b 17a | indoor fan |
| 20 | outdoor chamber |
| 21a, 21b | indoor chamber |
| 30 | terminal |
| 40 | vehicle-mounted system |
| 41 | vehicle-mounted communication device |
| 42, 43 | central device |
| 50 | ground system |
| 51 | ground communication device |
| 52 | database |
| 60 | communication network |
| 100 | railway vehicle |
| 101 | compartment |
| 102 | air duct |

The invention claimed is:

1. A vehicle air-conditioning apparatus mounted on a vehicle, comprising:
   a refrigerant circuit; and
   a control unit configured to control the refrigerant circuit,
   wherein the control unit is configured to determine whether the vehicle is stationary based on position information or speed information on the vehicle, cause the refrigerant circuit to operate when the vehicle is stationary, acquire state data on the refrigerant circuit at time when the vehicle is stationary, and detect whether abnormality occurs in the refrigerant circuit based on the state data.

2. The vehicle air-conditioning apparatus of claim 1, wherein
   the control unit is configured to compare the state data with previously acquired state data, and detect whether abnormality occurs in the refrigerant circuit based on a result of comparison.

3. The vehicle air-conditioning apparatus of claim 1, wherein
the control unit is configured to compare the state data with state data acquired from a vehicle air-conditioning apparatus mounted on a vehicle other than the vehicle, and detect whether abnormality occurs in the refrigerant circuit based on a result of comparison.

4. An abnormality detection system for a vehicle air-conditioning apparatus which is mounted on a vehicle, and which includes a refrigerant circuit and a control unit configured to control the refrigerant circuit, the abnormality detection system comprising:
the vehicle air-conditioning apparatus; and
a ground system connected to the control unit via a communication network,
wherein the control unit is configured to determine whether or not the vehicle is stationary based on position information or speed information on the vehicle, cause the refrigerant circuit to operate when the vehicle is stationary, acquire state data on the refrigerant circuit at time when the vehicle is stationary, and transmit the state data to the ground system, and
the ground system is configured to detect whether or not abnormality occur in the refrigerant circuit based on the state data.

5. The abnormality detection system of claim 4, wherein
the ground system is configured to compare the state data with state data acquired from a vehicle air-conditioning apparatus mounted on an other vehicle which is included in a train other than a train including the vehicle, and detect whether or not abnormality occurs in the refrigerant circuit based on a result of comparison.

* * * * *